United States Patent [19]

Maxey

[11] Patent Number: 4,484,543

[45] Date of Patent: Nov. 27, 1984

[54] ADJUSTABLE NON-THROTTLING CONTROL APPARATUS FOR SPARK IGNITION INTERNAL COMBUSTION ENGINES

[76] Inventor: Joel W. Maxey, 8400 Country Club Dr. N., Sarasota, Fla. 33580

[21] Appl. No.: 499,344

[22] Filed: May 31, 1983

Related U.S. Application Data

[63] Continuation-in-part of Ser. No. 50,483, Jun. 20, 1979, Pat. No. 4,354,459.

[51] Int. Cl.³ .............................................. F01L 7/00
[52] U.S. Cl. ............................ 123/80 BA; 123/90.15
[58] Field of Search ............. 123/80 BA, 90.15, 80 R, 123/190 A, 190 R

[56] References Cited

U.S. PATENT DOCUMENTS

| | | | |
|---|---|---|---|
| 1,107,382 | 8/1914 | Tygard | 123/80 BA |
| 1,871,268 | 8/1932 | Hildebrand | 123/90.15 |
| 1,925,755 | 9/1933 | Hemmingsen | 123/90.15 |
| 3,496,918 | 2/1970 | Finlay | 123/90.15 |
| 3,502,059 | 3/1970 | Davis | 123/90.15 |

*Primary Examiner*—Ronald H. Lazarus
*Attorney, Agent, or Firm*—Ronald E. Smith

[57] ABSTRACT

A valve assembly for use in internal combustion engine applications, of the type designed to regulate air-fuel mixture from a carburetor or other fuel injection means entering the cylinders of either two stroke cycle or four stroke cycle spark ignition engines to improve the part-load and full-load fuel efficiency of such engines by minimizing the pumping losses. This increase in efficiency is accomplished by regulating engine power output by employing time-duration-modulation control instead of the throttled or resistive intake control which is empolyed in the engines of the prior art. A rotary valve structure employs a tubular multi-port member comprising a rotary valve, with an outlet for each cylinder, operating at 15 p.s.i. maximum differential pressure and relatively low temperatures, connected in series with presently used poppet or reed or port type intake valves. Rotary valve timing or phase control is accomplished with a multi-pulley belt drive system.

The time-duration-control limits engine output by matching the effective compression ratio to that ratio required to meet the demand placed on the engine in less than full load conditions. An adjustable full load stop prevents the engine from reaching its full load output, thereby allowing the effective compression ratio to be affected by the inventive valve structure throughout the entire range of engine opertion. Since the novel valve assembly allows unlimited reduction of the effective compression ratio, the engine manufacturer may reduce clearance volumes and hence increase the engine expansion ratio independently of any effect on the effective compression ratio of the engine.

2 Claims, 3 Drawing Figures

ADJUSTABLE NON-THROTTLING CONTROL APPARATUS FOR SPARK IGNITION INTERNAL COMBUSTION ENGINES

CROSS-REFERENCE TO RELATED APPLICATIONS

This disclosure is a continuation-in-part of the disclosure filed June 20, 1979, bearing Ser. No. 50,483 now U.S. Pat. No. 4,354,459.

BACKGROUND OF THE INVENTION

1. Field of the Invention

This invention relates to a rotary valve mechanism for improving the fuel efficiency of automobile and other throttled, spark ignition internal combustion engines of both the two stroke cycle and four stroke cycle types, by minimizing the pumping losses or negative work even below the corresponding loss levels in compression ignition or diesel engines.

2. Description of the Prior Art

Throttled spark-ignition internal combustion engine technology is well known in the art. For a detailed description of the prior art, reference should be made to the file wrapper of the above identified co-pending disclosure.

In an automobile engine of the internal combustion type, the carburetor throttle is adjusted by the driver, through manipulation of the accelerator pedal, to a position which gives the desired power output. This throttling drops the engine intake pressure below atmospheric level thereby decreasing the engine performance to the required value. After the combustion process is completed in the various cylinders of the engine, the exhaust must be pumped out of such cylinders against atmospheric pressure. This in turn of course requires work to be expended to accomplish the flow of such exhaust against the existing atmospheric pressure on the exterior of the combustion cylinders. The pressure energy lost by the carburetor restriction must be replaced by work which would otherwise be available as useful power output at the flywheel if such energy were not required in exhausting the combustion cylinders. The above problems of course do not apply to diesel type engines which have no air throttle and therefore do not have this flow-work loss to reduce their efficiency.

However, such diesel type engines are inherently much more expensive and have reduced specific performance characteristics compared to conventional spark ignition internal combustion engines. Such engines must compress the air charge to high pressures and to ignition temperature whether at full load or at idling conditions.

Accordingly, there is a need for a device useful in gasoline engine applications that would substantially eliminate the negative work required of such engines due to throttled fuel intake of such engines. A practical device to eliminate such negative work does not appear in the prior art.

SUMMARY OF THE INVENTION

This disclosure is related to an improved version of the phase control assembly described in detail in the above identified copending disclosure. Specifically, an axially adjustable stop means is added to the earlier-disclosed assembly and is disposed in travel interrupting relation to the control arm of the phase control assembly such that each incremental advance of said stop toward the control arm increases the incremental distance between the full load position of the control arm and the actual attainable position of the control arm to which actual position said control arm is constrained by said stop.

It is therefore seen to be an important object of this invention to provide a means whereby the effective compression ratio of an engine may be affected by the novel valve assembly under all possible load conditions by preventing said engine from attaining its full load output.

The invention accordingly comprises the features of construction, combination of elements, and arrangement of parts which will be exemplified in the construction hereinafter set forth, and the scope of the invention will be indicated in the claims.

DETAILED DESCRIPTION OF THE PREFERRED EMBODIMENT

Figure 1:
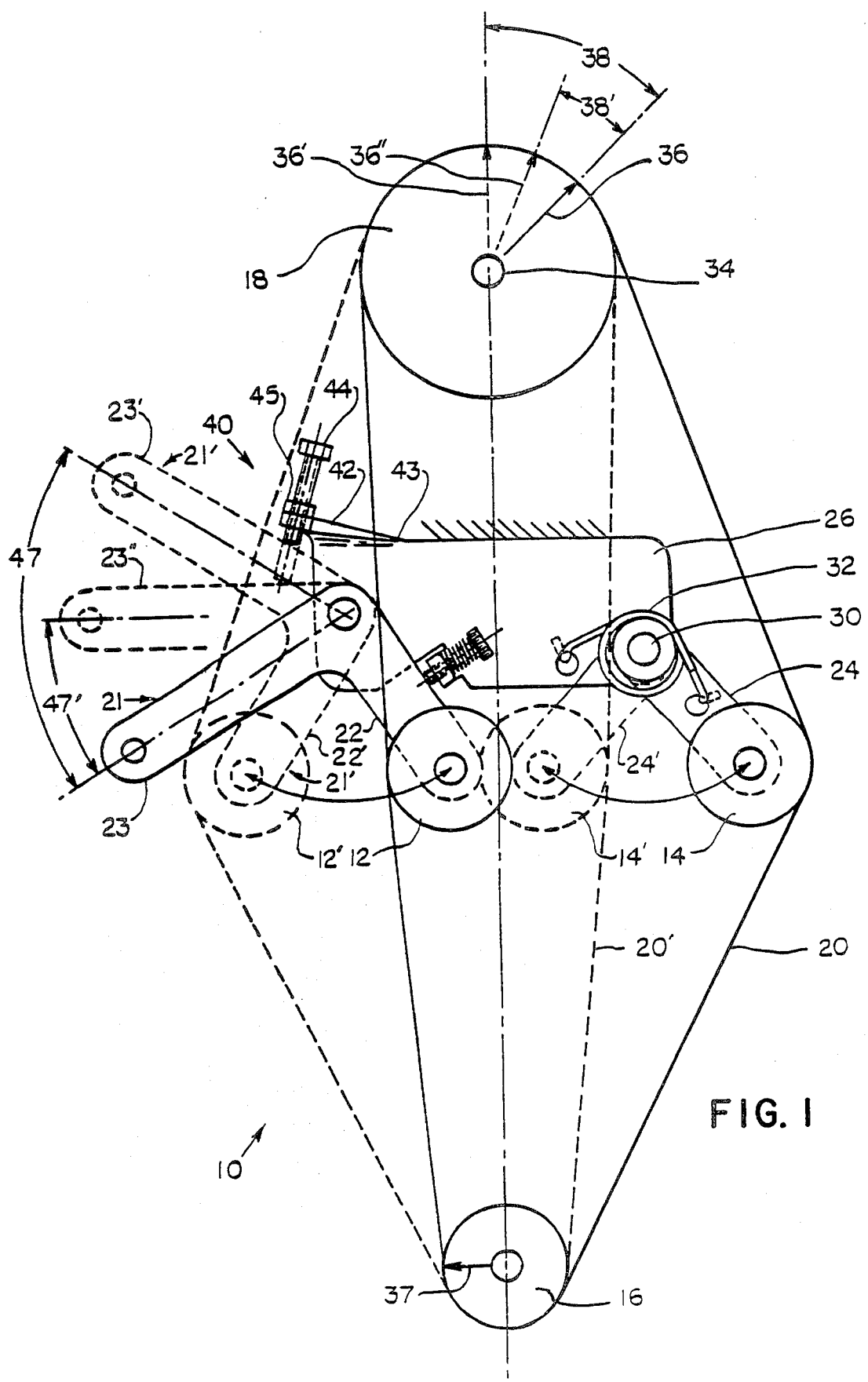
FIG. 1 is a partially schematic view of the novel phase shifting mechanism in a two-to-one drive load control mechanism, showing the preferred placement of the inventive adjustable full load stop.

Referring now to FIG. 1, it will be seen that the inventive phase control assembly is generally designated 10, and that the preferred embodiment contemplates the use of four (4) pulley means, designated 12, 14, 16 and 18, disposed in surrounded relation to a belt means 20 of the low-duty, instrument drive type. Pulley 12 is rotatably mounted as shown on bell crank member 21, having arms 22, 23, and pulley 14 is rotatably mounted on the free end of lever 24. Bell crank 21 and lever 24 are pivotally mounted on bracket member 26, at opposed ends thereof, the bell crank 21 being pivotally attached to said bracket 26 at its fulcrum 28, and the lever 24 being pivotally attached to bracket 26 as at 30.

A low rate bias means 32 urges the lever 24 and hence pulley 14, belt 20 and bell crank 21 to assume the position shown in solid lines in FIG. 1. Accordingly, pulley 14 is a tension pulley. Bell crank 21 is operatively connected by means (not shown) to an operator-controlled accelerator pedal so that as the automobile driver places increasing amounts of load on the engine, the bell crank 21 is caused to pivot about its fulcrum 28 in a clockwise direction as seen in FIG. 1, until, at full load, the bell crank 21 and hence belt 20 and tension pulley 14 will assume the positions shown in phantom lines in FIG. 1, and designated 21', 20' and 14', respectively.

Pulley 16 is rotatably mounted on a rotating shaft of the engine, such as the crankshaft or camshaft, or any other shaft that rotates at a fixed ratio to the rotation of the crankshaft, such as the distributor shaft. Of course, upon selecting a suitable rotating shaft, a simple speed reduction or speed increasing connection may need to be made between the selected shaft and pulley 18 to bring the frequency of rotation of the rotor shaft 34 (see FIG. 2) into conformity with the frequency of rotation of the crankshaft, such connection of course being an expedient matter as long as the frequency of rotation of the crankshaft and preselected shafts are directly proportional to one another, as aforesaid.

Figure 2:
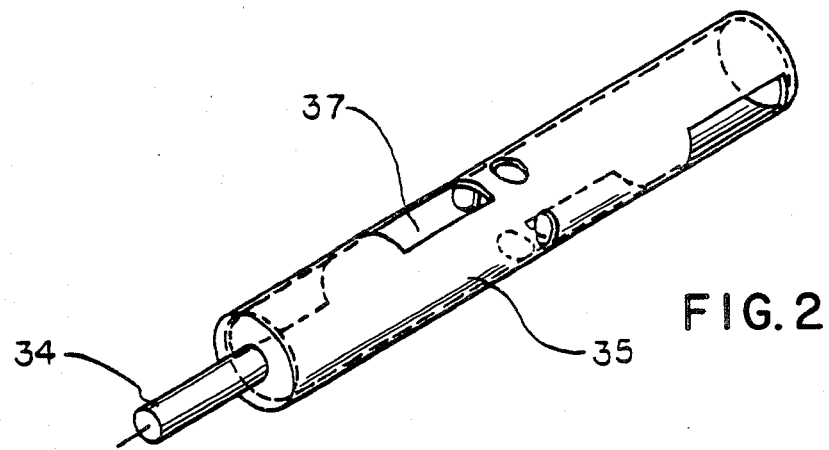
FIG. 2 is an isometric view of the structural detail of the rotor means of the present invention.

Accordingly, pulley 16 is a driving pulley, whereas pulley 18 is a driven pulley. Driven pulley 18 is fixedly secured to axle means or rotor shaft 34 (FIG. 2) and accordingly rotates conjointly therewith. Axle means 34 is integrally formed with, or fixedly secured to, the multi-ported (or singularly ported, in single cylinder engine applications) rotary valve means 35 (FIG. 2). The rotor 35 is designated 64 in FIG. 5 of the cross-referenced disclosure and is described in greater detail therein.

As explained in such earlier disclosure, displacement of the path of travel of belt 20 from its idle position as shown in solid lines in FIG. 1, by manipulation of bell crank 21 through an angle 47, effects a shift in the phase relationship between the driving and driven pulleys 16 and 18. For example, the radial arrow shown as solid line 36 in FIG. 1 on pulley 18 will shift by an angle designated 38, from position 36 to position 36′, as control pulley 12 travels from its idle position to its full load position 12′, whereas radial arrow 37 on driving pulley 16 maintains its position. The phase shifting between the driving and driven pulleys 16 and 18 causes the ports formed in the rotor 35 to close at an earlier point in the intake stroke of a piston associated with a port in said rotor 35, such closing of such port operating to interrupt the flow of a fuel mixture (or the flow of air, in fuel injection engines) into the combustion chamber. Later closings of the ports occur attendant increased degrees of phase shifting between the driving and driven pulleys. In the cross-referenced disclosure, the closing of the rotating ports formed in the cylindrical rotor would substantially correspond to the closing of the intake poppet valves under full load conditions and, accordingly, the inventive phase shift assembly played no part in engine operation under such conditions.

Under the improved structure of the phase shift assembly 10, an adjustable stop, generally designated 40, is added and provides a means whereby the travel of the bell crank 21 is adjustably limited so that the bell crank 21 is barred from assuming its full load position. Accordingly, early closing of the rotating ports will occur under all load conditions. The amount of useful power lost by preventing the usual full load intake of fuel into the combustion chambers is not negligible, but the fuel economies attained by such early port closings is substantial. A cost/benefit analysis argues persuasively in favor of trading some peak horsepower output for substantial fuel savings.

The adjustable stop assembly comprises a mounting arm 42 that is fixedly secured to bracket 26 as at 43. The distal free end of arm 42 is preferably internally threaded to receive externally threaded bolt means 44 in complementally screw threaded relation therewith. A lock nut 45 prevents inadvertent or casual axial adjustment of bolt 44. As is clearly shown in the drawing, axial advancement of bolt 44 relative to arm 42 and hence toward the arm 23 of bell crank 21 limits the pivotal travel 47 of arm 23, since such arm 23 and the advancing end of bolt 44 enter into abutting relation with one another. Each turn or partial turn of the bolt 44 increasingly limits the travel of arm 23, as at 23″. With arm 23 in position 23″, arrow 36 on pulley 18 will have shifted to position 36″. With bolt 44 fully retracted, or removed from arm 23, the engine is able to reach full load, of course. The 23″ position of arm 23, shown in phantom lines in FIG. 1, having pivoted through angle 47′, is the position to which arm 23 is constrained, when bolt 44 is axially advanced as shown in phantom lines in said Figure.

The physical disposition of the adjustable stop assembly 40 as shown in FIG. 1 is chosen to reduce operator-initiated stress on the belt 20 and pulleys 16 and 18, since positioning stop 33 as shown in FIG. 4 of the cross-referenced disclosure would allow the operator to put excessive amounts of stress on the belt 20.

The effect of the phase shifting described briefly hereinabove and in more detail in the cross-referenced application, is to effectively lower the compression ratio of the engine attendant earlier closing of the ports of the rotor 35, (64 in the earlier disclosure, as aforesaid) which closing is attendant rotation of the rotor 35, and which is therefore independent of poppet valve action. In conventional throttled engines, the compression and expansion ratios of the engine are equal and unchanged as the engine experiences load conditions from idle to full load, since fuel is resistively drawn into the combustion chambers during, substantially, the entire intake stroke of the piston or pistons. Lesser amounts of fuel are drawn in under low load conditions, as compared to higher load conditions, but since the intake poppet valves close as the pistons approach their bottom dead center positions under the full range of load conditions, (remaining closed during the compression and power expansion stroke, of course) the compression ratio of the conventional spark ignition engine is substantially fixed under all load conditions. In sharp contrast, the novel apparatus, by providing for early port closure, i.e., by terminating fuel flow into the combustion chambers before the pistons have reached their respective BDC positions, effectively decreases the compression ratio under low load conditions and effectively increases the compression ratio under relatively higher load conditions. As such, the effective compression ratio of the engine varies in accordance with engine load conditions, since lesser or greater amounts of fuel (or air, in fuel injection applications) are admitted by the rotating ports past the open intake poppet valves into the combustion chambers responsive to lower or higher load conditions, respectively. Such lesser or greater amount of fuel is of course compressed, during the compression stroke of the piston, into the same space (clearance volume), resulting in the effectively lesser or greater compression ratio. Early port closing also allows a longer evaporation time and provides a more thorough and hence more efficient air-fuel mixture due to the additional "expansion" of the combustion chamber attendant retraction of the piston after the flow of fuel or air thereinto has been interrupted by the closing of the rotor 35.

Figure 3:
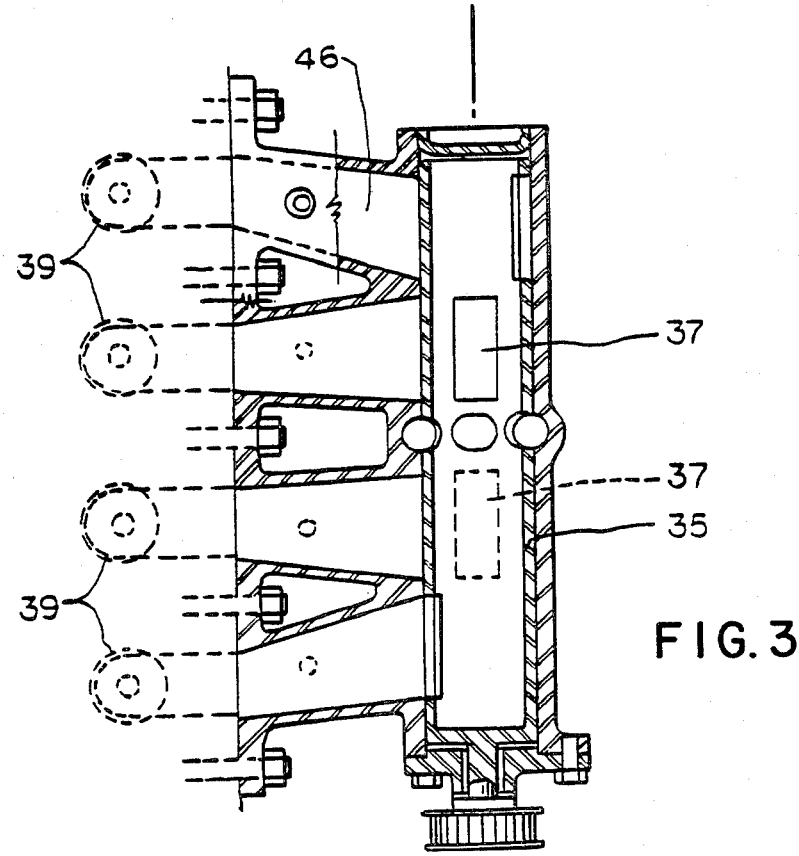
FIG. 3 is a top plan view, in partial section, of the four cylinder rotary valve assembly, showing how the passage means interconnect the rotor outlet portions with the poppet valves of the engine.

Clearly, then, the inventive phase shift mechanism effectively controls engine output by providing means whereby a close correlation is maintained between the load on the engine and the fuel supplied to the engine, said fuel being supplied to the engine by means of a coincidence detecting apparatus—fuel, or air, enters the combustion chamber only when a port 37 in the rotor 35 transiently aligns with an open intake poppet valve 39 (via passage means 46 (FIG. 3)—, said coincidence detecting means for providing fuel—or air, in fuel injection systems—operative to provide such fuel—or air—in the absence of a throttling or resistive intake thereof, such that the effective compression ratio and hence the instantaneous power output of the engine is essentially resonant with the actual load demand on the engine, i.e., power output and load are matched. This matching of power output and load results in maximum engine operating efficiency. In conventional, throttled fuel intake engines, however, in less-than-full-load conditions, the reduction of engine power output to match load demand thereon is accomplished by requiring the engine to perform greater amounts of negative work—i.e., increased throttling increasingly lowers the cylinder pressure, which negative pressure must be overcome by the engine before positive work can be performed.

By reducing the effective compression ratio of the engine to the level required to match the load demands thereon, and the maximum effective compression ratio to the detonation limit of the fuel being used, the inventive assembly makes it possible to further increase engine efficiency by increasing the expansion ratio of the engine. Diesel engines employ high compression ratios (i.e., the ratio of total cylinder volume to clearance volume is high) and accordingly enjoy high expansion ratios such as 20 or 25:1. The price paid for such increased expansion ratios, as is well known, is the weight of materials which must be used to make such an engine. In spark ignition engines having throttled fuel intake systems, an increase in the expansion ratio—by reducing the clearance volume when the engine is manufactured—would also increase the compression ratio to diesel engine levels. However, conventional gasoline engines are limited by the detonation characteristics (spark knock) to about twelve to 1, even with 100 octane fuel. Accordingly, conventionally throttled gasoline engines are restricted to relatively low compression ratios and hence have reduced expansion ratios relative to diesel engines. The inventive system, however, by limiting the maximum effective compression ratio of the engine to whatever compression ratio is needed for the fuel octane in use, and the instantaneous compression ratio actually needed to meet instantaneous demand, allows the clearance volume of the engine to be reduced—thereby increasing the expansion ratio and engine operating efficiency. Thus, the novel system divorces the effective compression ratio from its conventional reliance and attachment to the expansion ratio. Clearance volumes may be reduced, increasing engine efficiency by increasing the expansion ratio, and the effective compression ratio and power output may be matched by the operator to the load, as if the expansion ratio had not increased, all due to the provision of the valve assembly partially described hereinabove and more fully described in said cross-referenced disclosure.

It will thus be seen that the objects set forth above, and those made apparent by the preceding description, are efficiently attained, and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Now that the invention has been described, that which is claimed:

1. In a spark ignition, single or multi-cylinder internal combustion engine of the four stroke cycle or two stroke cycle type having cylinder intake means of the intake poppet valve type or sliding ports or reed type, respectively, and a fuel mixture feed of the carburetor or fuel injection type, an assembly for matching engine power output to engine load conditions, in the absence of throttling the fuel mixture or air feed of such engine, wherein the improvement comprises a phase shift assembly comprising first, second, third, and fourth pulleys, a drive element interconnecting said pulleys, and disposed in surrounding relation thereto, said first pulley mounted for conjoint rotation with a driving shaft of said engine that rotates in a fixed ratio with the crankshaft of said engine, said second pulley mounted for conjoint rotation with a shaft that is rotatably driven by said drive element attendant rotation of said first pulley, a rotary valve means disposed in axial alignment with said shaft of said second pulley and secured to said shaft for conjoint rotation therewith, said rotary valve means comprising a hollow, elongate, rotor means having in inlet and an outlet portion, a non-rotatable connector means disposed in unrestricted fluid communication between the outlet of said carburetor or fuel injection means and the inlet of said rotor means, a non-rotatable passage means having an inlet and an outlet portion, the outlet of said rotor means disposed in fluid communication with the inlet of said passage means, the outlet of said passage means disposed in fluid communication with said intake poppet valves, or in communication with port or reed valves, said third and fourth pulleys being independently mounted relative to one another and providing control and tension pulleys, respectively, such that displacement of said control pulley effects a change in the phase relation between said first and second pulleys by changing the tension side pitch length of said drive element, said serial connection of said connector means, said rotor means, and said passage means providing a means for commencing and terminating flow of a fuel mixture, or air, into the combustion chambers of said engine, independent of poppet valve action, on a timed basis so that the effective compression ratio of the engine is thereby varied to meet the varying load demand on the engine, said matching of engine power output and engine load obviating the need to throttle said engine and therefore substantially reducing the amount of negative work done by said engine and hence substantially reducing the amount of fuel consumed by said engine, and whereby such controlling of the effective compression ratio of such engine permits reduction of cylinder clearance volumes and hence permits increased expansion ratios and increased thermal efficiency.

2. The engine of claim 1, further comprising means for adjustably limiting the displacement of said control pulley so that said control pulley is adjustably barred from reaching its full displacement position so that at least some phase shifting between said driving and driven pulleys occurs even when said control pulley is displaced to the fullest extent possible as limited by said adjustable limiting means, said limiting of control pulley displacement serving to prevent said engine from entering the detonation range for the fuel being used.

* * * * *